United States Patent [19]
Mitsui

[11] Patent Number: 5,411,300
[45] Date of Patent: May 2, 1995

[54] HOSE CONNECTING ASSEMBLY

[75] Inventor: Kenichi Mitsui, Inazawa, Japan

[73] Assignee: Toyoda Gosei Co., Ltd., Inazawa, Japan

[21] Appl. No.: 31,862

[22] Filed: Mar. 16, 1993

[51] Int. Cl.6 .............................................. F16L 13/00
[52] U.S. Cl. .................................... 285/292; 285/155; 285/156; 285/371; 285/381
[58] Field of Search ............... 285/284, 292, 154, 155, 285/381, 371

[56] References Cited

U.S. PATENT DOCUMENTS

| | | | |
|---|---|---|---|
| 4,676,532 | 6/1987 | Gronau et al. | 285/156 |
| 4,718,700 | 1/1988 | Horch et al. | 285/156 |
| 4,997,213 | 3/1991 | Traner et al. | 285/292 X |
| 5,030,487 | 7/1991 | Rosenzweig | 285/381 X |
| 5,033,775 | 7/1991 | Matte et al. | 285/381 X |
| 5,039,134 | 8/1991 | Meadows et al. | 285/156 X |
| 5,125,693 | 6/1992 | Mogavero | 285/292 X |

FOREIGN PATENT DOCUMENTS

| | | | |
|---|---|---|---|
| 3730427 | 3/1989 | Germany | 285/292 |
| 4296290 | 10/1992 | Japan | 285/292 |
| 4337188 | 11/1992 | Japan | 285/292 |
| 2182408 | 5/1987 | United Kingdom | 285/292 |

Primary Examiner—Dave W. Arola
Attorney, Agent, or Firm—Cushman, Darby & Cushman

[57] ABSTRACT

A hose connecting assembly comprises a connecting tube 1 made of a resin, flexible hoses 21, 22 and 23 each having a reinforced layer which is braided with reinforcing threads, into which the connecting tube 1 is inserted, and a resin cover 3 which covers coupling portions between the hoses and the connecting tube integrally therewith. The cover 3 is formed by molding and includes a reinforcing filler and has a post-shrinkage factor of 0.2 to 0.9%. The hoses have inner diameters which have been increased 10 to 30% by the insertion of the connecting tube 1 thereto. Stress cracks are prevented from occurring and high sealing pressure is provided.

19 Claims, 7 Drawing Sheets

5,411,300

HOSE CONNECTING ASSEMBLY

BACKGROUND OF THE INVENTION

1. Field of the Invention

The present invention relates to a hose connecting assembly and, in particular, one used for connecting a hose to a fitting, for connecting together several hoses or forming branched connections using two or more hoses.

2. Background Information

A hose connecting assembly, used for a branch connection, is described in Japanese Unexamined Patent Publication Tokkai-Sho 62-233591 and 62-233592, which correspond to U.S. Pat. No. 5,033,775. As shown in FIG. 12, the hose connecting assembly comprises a T-shaped connecting tube 100 which allows three hoses 201, 202 and 203 to be connected to one another in three directions. A plastic cover 300 extends around the whole connection. In order to assemble this hose connecting assembly, each connecting portion of tube 100 is inserted into hoses 201, 202 and 203 respectively. Thereafter, each connecting portion of tube 100 is placed in a mold and a reinforced polyamide resin cover 300 is formed about the exterior of the tube and connection hose. Since the resin cover 300 is shrunk at a shrinkage factor of 1% or more as it solidifies, a sufficient diameter reducing force is applied upon the surface of each of the hoses. This causes each hose to be nipped between cover 300 and the respective portion of connecting tube 100 to provide a high sealing pressure. A similar hose connecting assembly is disclosed in U.S. Pat. No. 4,997,213.

Such hose connecting assemblies permit the creation of high sealing pressures by a simple method. However, since the presence of residual stress in the formed resin cover may be high if the thermal shrinkage factor in the fiber reinforced polyamide resin is as high as not less than 1%, stress cracking may occur in the cover due to the accumulation of road salt. This was shown by an experiment in which the hose connecting assembly was immersed in a high concentration zinc chloride.

The present inventors have found that the stress cracks have specific properties in position where they occur. That is, the stress cracks readily occur particularly at welds which are formed on molding.

SUMMARY OF THE INVENTION

It is therefore an object of the present invention to provide a hose connecting assembly having a high sealing pressure and in which stress cracks are prevented from occurring.

In order to achieve the above mentioned object the hose connecting assembly is designed to have a post-shrinkage factor of about 0.2 to 0.9% but in any event less than 1%. The connection also permits the inner diameter of the tubing to be increased by 10 to 30%.

The connecting tube has opened ends which are inserted into the hoses. The number of opened ends are not limited to any specific number or to a specific design. The connecting tube is preferably made of a resin material which will swell due to the temperature or absorption of the fluid flowing through it. For example, nylon 6,6 having a water absorbing property is recommended if the fluid is, for example, water. The connecting tube should have a resistance against the injection pressure exerted when the cover is formed and preferably has a rigidity which is higher than that of the cover.

Accordingly, it is preferable to form the connecting tube from a reinforced synthetic resin which is blended with a reinforcing filler.

Each of the flexible hoses have a reinforcing layer which is braided with reinforcing threads or yarn. The reinforcing layer will increase a reaction force which reacts against the encased diameter caused by insertion of the connecting tube into the hose so that sealing pressure is increased. The hoses may be made of any flexible material that can withstand the pressures, temperatures and types of fluids, for example, rubber, elastomer and the like.

One feature of the present invention resides in that the inner diameter of the hoses can be increased 10 to 30% by the insertion of the connecting tube thereto. If the rate of increase in the inner diameter is lower than 10%, the sealing pressure between the connecting tube and the hose is lowered. If it is higher than 30%, it will become difficult to insert the connecting tube into the hoses. Forced insertion of the connecting tube into the hoses should be such that strength problems will be avoided.

Another feature of the present invention resides in the structure of the resin cover. The cover includes a reinforcing filler material and is formed in such a manner that the post-shrinkage factor falls in the range of 0.2 to 0.9%. If the shrinkage factor is less than 0.2%, insufficient sealing pressure would be developed. If the shrinkage factor is higher than 0.9%, stress cracks might occur. It is preferable that the material of the cover be polyamide resins such as nylon 6 or nylon 6,6, polyester resins, PPS (polyphenylene sulfide), but other synthetic resins may also be used.

Since it is difficult to adjust the shrinkage factor of the cover so that it falls within the desired range only by changing the amount of the resin, adjustment of the shrinkage factor is achieved by blending a reinforcing filler into the resin. As the reinforcing filler, powdery filler of calcium carbonate, barium sulfate, etc., inorganic fibers such as glass fibers, metal fibers and ceramic fibers, or organic fibers such as rayon, aromatic polyamide fibers may be used when nylon 6,6 is blended with glass fibers as a filler, the shrinkage factor may fall within the above mentioned range by blending the glass fibers at 15 to 45% by weight for the total of the blend.

The blended resin cover can be formed by placing the hose and connection tube assembly into a mold and then molding the cover using injection or other conventional molding techniques.

The hose connecting assembly may further include a protecting layer over the outer surface of any joint or weld which might result on molding of the cover. It suffices for the protecting layer to have the capability of preventing the resin cover from being in contact with snow melting salt such as zinc chloride. The protecting layer may be comprised of a resin film or a metal film, or various other coating or adhesive films. The protecting layer may be formed integrally with the cover and simultaneously with molding or it may be applied after molding.

In a second aspect of the present invention, the cover has at opposite ends annular projections with project in an inward and radial direction to bit into the hose.

Since the post-shrinkage factor of the resin cover falls in the range of 0.2 to 0.9%, the hose connecting assembly of the present invention has such a low residual stress after molding that stress cracking is prevented from occurring. Since the resin of the cover includes reinforcing fibers, heat resistances such as heat deformation properties can be improved.

A further feature of the present invention resides in that the resin cover can have annular projections on the inner edges of the outer ends, the ends thereof, which bite the hoses. The hoses will be nipped and compressed between the annular projections and the outer surface of the connecting tube so that the strength of fastening between the hoses and the connection tube will be further enhanced. It is preferable that the annular projections be located at a position corresponding to any annular ribs provided on the connecting tube. This causes the hoses to be further compressed so that the fastening strength is further enhanced.

The resin cover may be divided into a plurality of covering portions which are spaced in an axial direction of the connecting tube. In this case, the divided covering portions may be formed with the annular projections at respective ends thereof. Since the divided covering portions do not have good appearance, further coverings may be formed over the entire of the resin cover.

In order to form the annular projections, the resin cover is molded while the hoses are pressed inwardly by the mold toward the connecting tube. Since the hoses have a reduced outer diameter where they are compressed, annular projections are formed at those locations. Eliminating the pressing force applied upon the hoses after solidification of the molded article allows the hose to recover elastically and the annular projections will bite the hose, thus increasing the fastening strength and sealing pressure against the hose.

The annular projections can be easily formed simultaneously with molding of the resin cover and the number of manufacturing steps is not increased. Accordingly, the hose connecting assembly which exhibits excellent fastening strength, is economically provided.

DETAILED DESCRIPTION OF THE INVENTION

The present invention will be described by way of embodiments with reference to drawings.

EMBODIMENT 1

Figure 1:
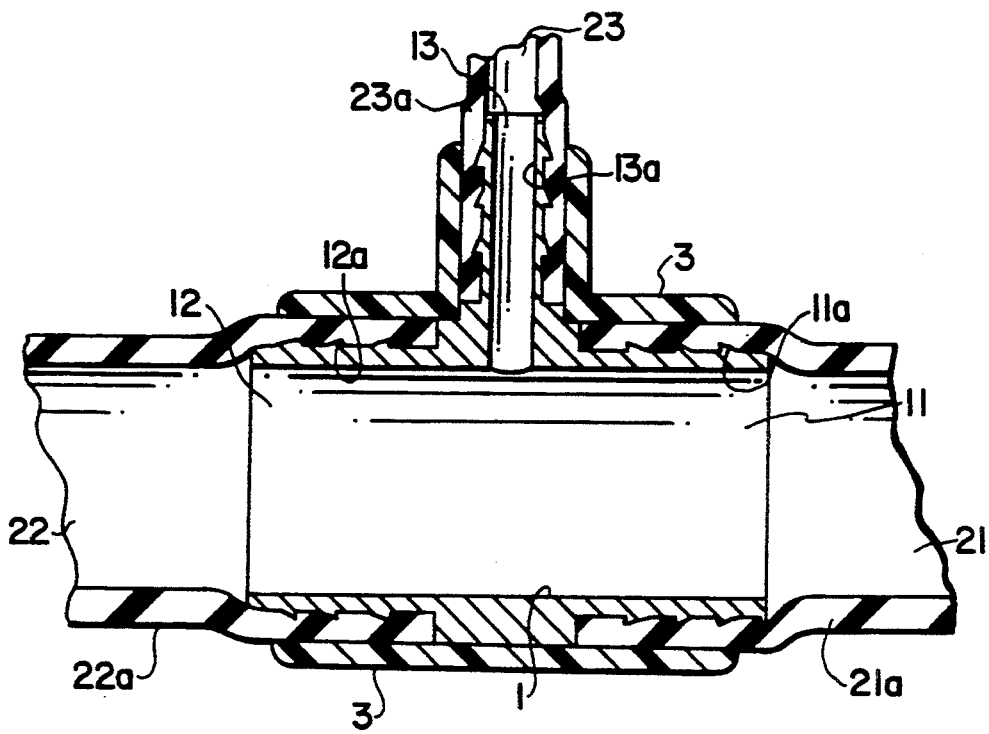
FIG. 1 is a sectional view showing a main part of a hose connecting assembly in an embodiment of the present invention.

Referring now to FIG. 1, there is shown a sectional view of a first embodiment of a hose connecting assembly of the present invention. The hose connecting assembly comprises a connecting tube 1 made of a metal and, hoses 21, 22 and 23 made of rubber which are connected to the connecting tube 1. A cover 3, made of a resin, covers the connecting portions between the connecting tube 1 and hoses 21, 22 and 23.

The connecting tube 1 has three hollow open ended branches 11, 12 and 13. The open ended branches 11 and 12 have the same inner diameter and extend in the same axial direction and are opened at the opposite ends thereof. A passage which connects the open end branches 11 and 12 constitutes a main passage for, for example, engine coolant. The open end branch 13 has an axis which is perpendicular to the axis of the open ended branches 11 and 12, an inner diameter that is smaller than the inner diameter of branches 11 and 12, and is in communication with the open end branches 11 and 12. Branch 13 constitutes a subsidiary passage for coolant.

The open ended branches 11 and 12 are inserted at the distal ends thereof into the hoses 21 and 22 having the same diameter as those of the open end branches 11 and 12, respectively. The open end branch 13 is inserted into the hose 23 having a diameter smaller than those of the hoses 21 and 23. The open end branches 11, 12 and 13 are provided with a plurality of circumferential annular ribs 11a, 12a and 13a on the outer peripheries thereof, respectively. The ribs 11a, 12a and 13a are spaced in an axial direction and have saw-tooth shaped sections.

The hoses 21, 22 and 23 are used at a pressure 1 to 2 kg/cm$^2$ and has such a triple-layered structure that they comprise three reinforced layers 21a, 22a, and 23a which are braided with nylon threads and are laminated in such a manner that EPDM (ethylene-propylene-diene terpolymer) layers are sandwiched therebetween.

The open end branches 11 and 12 have an inner diameter which is the same as that of the hoses 21 and 22 and have an outer diameter which is 20% larger than the inner diameter. The open end branch 13 has an inner diameter which is the same as that of the hose 23 and has an outer diameter which is 20% larger than that of the hose 23. Accordingly, the inner diameters of the hoses 21, 22 and 23 into which the respective open end branches 11, 12 and 13 are inserted are increased 20% than those when no open end branches are inserted.

The resin cover 3 is formed by molding a fiber-reinforced resin in which 30% by weight of glass fibers are included in nylon 6,6 and is formed so that post mold shrinkage factor is 0.2 to 0.5%. A term "post-shrinkage factor" used in the description of the embodiments means a value which is obtained by measuring the shrinkage factor of a flat plate sample made of the same material as the resin cover 3 in an orientation direction of glass fibers.

A method of forming this hose connecting assembly will now be described. Firstly, the open end portions 11, 12 and 13 of connecting tube 1 are inserted into the hoses 21, 22 and 23, respectively. This causes the inner diameters of the hoses to be increased 20%. The ribs 11a, 12a and 13a prevent the hoses from being removed from the respective open end portions 11, 12 and 13. The connecting tube 1 is placed in a mold while the open end portions are inserted respectively, into the hoses 21, 22 and 23 so that the connection portions between the tube 1 and the hoses are located in a mold. The resin cover 3 is formed from a glass fiber reinforced nylon 6,6 by conventional injection molding techniques. Shrinkage occurs in the resin cover 3 until the cover 3 is cooled to solid form following the injection phase of molding. Therefore, both a diameter increasing force, from the respective open end positions following their insertion into the hose, and a diameter decreasing force, from the molded cover 3, are applied to the hoses 21, 22 and 23. Consequently, the hoses are nipped in squeezed between the connecting tube 1 and the cover 3. This causes the hoses 21, 22 and 23 to be brought into pressure contact with the connecting tube 1 and the cover 3 so that the hose connecting assembly of the present embodiment exhibits a high sealing pressure and high fastening strength.

Figure 12:
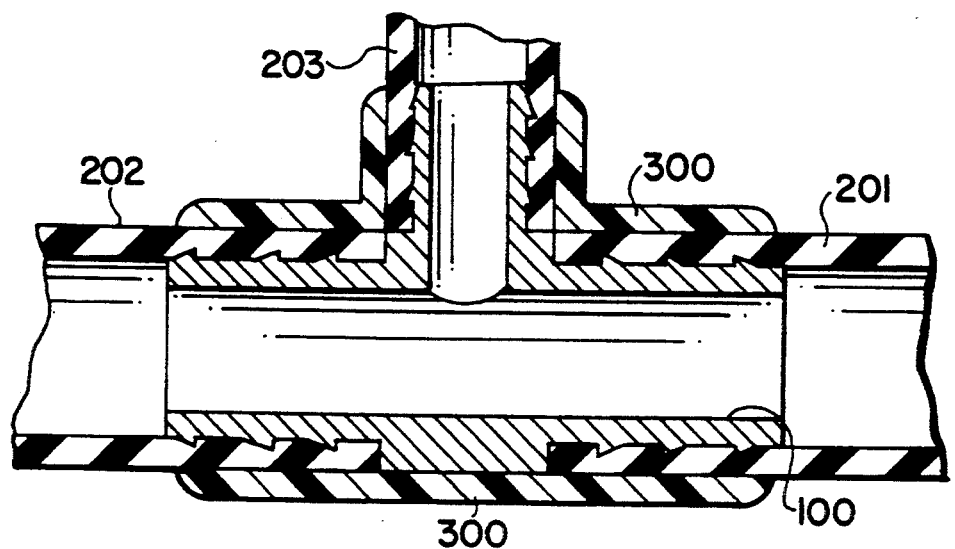
FIG. 12 is a sectional view showing a prior art hose connecting assembly.

As mentioned above, the open end portions 11 and 12 of the connecting tube 1 have the same inner diameter as tube of the respective hoses 21 and 22 and the open end position 13 has the same inner diameter as that of the hose 23 in the present embodiment. Accordingly, there is no portion which projects into inside of the hose unlike the prior art assembly shown in FIG. 12, resulting in a more smooth flow of the coolant.

Since the reinforcing fibers are contained in the resin of the cover 3, the cover has an increased rigidity and an reduced thickness. It can also be given a frosted outer surface, providing an improved quality in appearance.

EXPERIMENTAL EXAMPLE 1

Various hose connecting assemblies were made which were substantially identical with the assembly of the above mentioned embodiment except that the loadings of the glass fibers are different from those of the embodiment 1 as shown in Table 1. These hose connecting assemblies had different post-shrinkage factors of the resin covering. The sealing pressures and the stress crack occurring time of the hoses in the hose connecting assemblies were measured. The sealing pressures were obtained by measuring the maximum pressure the assembly could endure while the two end portions were closed and a water pressure was applied via the remaining one end portion. The stress crack occurring time was obtained by measuring a lapsed period of time until a stress crack occurred in the cover following the dipping of the entire assembly in a zinc chloride aqueous solution having 50% concentration. The results are shown in Table 1.

TABLE 1

| Performances of products | | | | Material Characteristics | | |
|---|---|---|---|---|---|---|
| glass thermal fiber content (%) | post-shrinkage factors (%) | stress crack occurring time | sealing pressure (kg/cm²) | flexural modulus (kg/cm²) | tensile break strgth (kg/cm²) | deformation temp. (°C.) |
| 0 | 0.8–1.5 | within 24 hours | 11 | 29000 | 700 | 220 |
| 15 | 0.7–0.9 | about 1 week | 10 | 53000 | 1150 | 245 |
| 30 | 0.2–0.5 | 2 weeks or more | 10 | 85000 | 1800 | 255 |
| 45 | 0.2–0.5 | 2 weeks or more | 10 | 125000 | 150 | 255 |

It is found from Table 1 that the stress cracking resistance is remarkably improved in the case where the glass fibers are added and the post shrinkage factor is 0.2 to 0.9%. The sealing pressure is as high as 10 kg/cm² The sealing pressure was measured when a hose was removed from an assembly. The sealing pressure in case in which no resin cover 3 was provided as 5 kg/cm².

Figure 2:
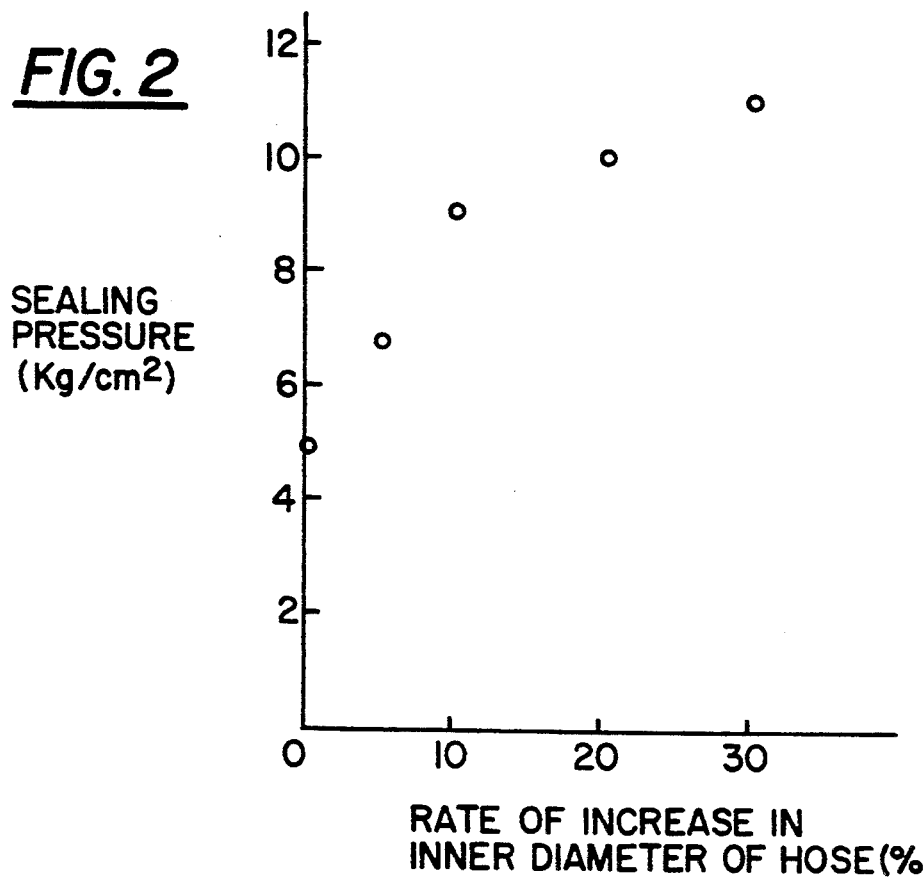
FIG. 2 is a graph showing the relation between the factor of the increase in the inner diameter of a hose and the sealing pressure.

Hose connecting assemblies were made which were substantially identical with the embodiment 1 except that the outer diameters of connecting tube 1 were different. The sealing pressure of respective assemblies were measured. The results are shown in FIG. 2. It is found from FIG. 2 that the sealing pressure which is 9 kg/cm or higher is assured if the diameter increasing percentage falls in the range from 10 to 30%.

EMBODIMENT 2

Figure 3:
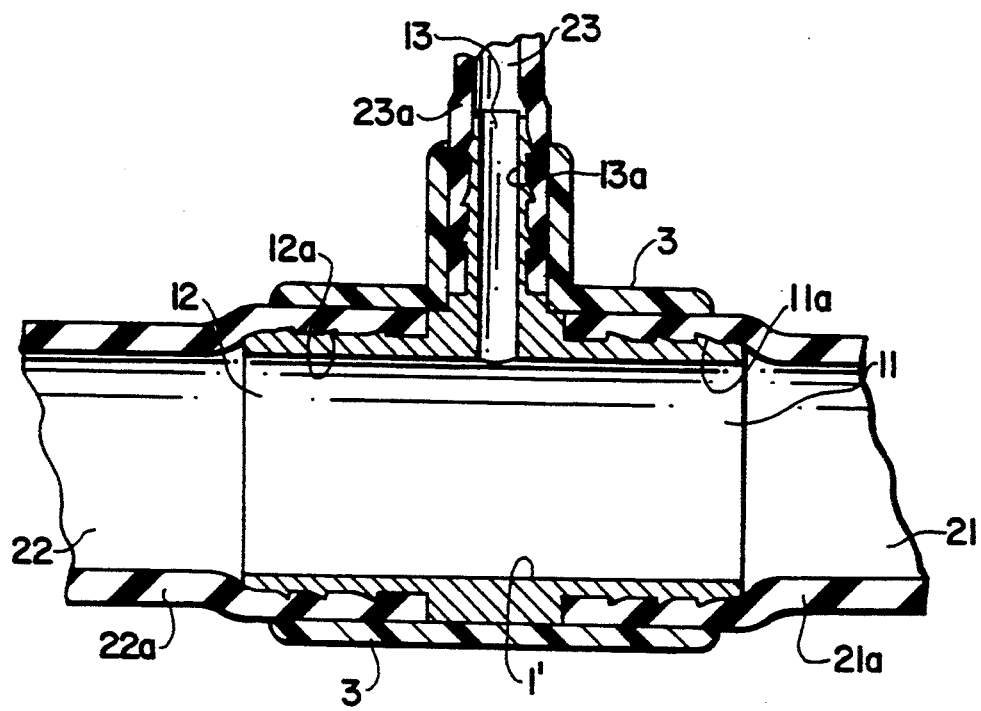
FIG. 3 is a sectional view showing a main part of a hose connecting assembly in a second embodiment of the present invention.

Referring now to FIG. 3, a sectional view is shown of a second embodiment 2 of a hose connecting assembly produced according to the present invention. The hose connecting assembly comprises a connecting tube 1' made of a resin, hoses 21, 22 and 23, made of rubber which are connected to the connecting tube 1' and a cover 3, made of a resin, which covers the connecting portions between the connecting tube 1' and hoses 21, 22 and 23.

The connecting tube 1' is formed of nylon 6,6 containing 30% by weight of glass fibers by injection molding and has the same shape as that of the connecting tube 1 of the embodiment 1.

The hoses 21, 22 and 23 are used at a pressure 1 to 2 kg/cm and has such a triple-layered structure that they comprise three reinforced layers 21a, 22a, and 23a which are braided with nylon threads and are laminated in such a manner that EPDM (ethylene-propylene-diene terpolymer) layers are sandwiched therebetween.

The open end branches 11 and 12 have an inner diameter which is the same as that of the hoses 21 and 22 and have an outer diameter which is 20% larger than the inner diameter. The open end branch 13 has an inner diameter which is the same as that of the hose 23 and has an outer diameter which is 20% larger than that of the hose 23. Accordingly, the inner diameters of the hoses 21, 22 and 23 into which the respective open end branches 11, 12 and 13 are inserted are increased 20% than those when no open ends are inserted.

The resin cover 3 is formed by molding a fiber-reinforced resin in which 15% by weight of glass fibers are included in nylon 6,6 that cover is formed so that the post mold shrinkage factor ranges from 0.7 to 0.9%.

A method of forming this hose connecting assembly will now be described. The connecting tube 1' is formed of glass fiber reinforced nylon 6,6 by conventional injection molding techniques. The open end branches 11, 12 and 13 of the connecting tube 1' are inserted into the hoses 21, 22 and 23 respectively. This causes the inner diameters of the hoses to be increased 20%. The ribs 11a, 12a and 13a prevent the hoses from being removed from the respective open end branches 11, 12 and 13. The connecting tube 1' is placed in a mold while the open end branches are inserted into the respective hoses 21, 22 and 23 so that the resulting connection portions between the tube 1' and the hoses are located in that mold. The resin cover 3 is formed from a glass fiber reinforced nylon 6,6 also by conventional injection molding techniques. Shrinkage occurs in the resin cover 3 until the cover 3 is cooled to solid form following the injection phase of molding. Therefore, both a diameter increasing force, from the respective open end portions following their insertion into the hoses, and a diameter decreasing force, from the cover 3 forming are applied to the hoses 21, 22 and 23. This results in the hoses being nipped or squeezed between the connecting tube 1' and the cover 3. This causes the hoses 21, 22 and 23 to be brought into pressure contact with the connecting tube 1' and the cover 3 so that the hose connecting assembly of the present embodiment exhibits a high sealing pressure and high fastening strength.

EXPERIMENTAL EXAMPLE 2

An experiment which is similar to the embodiment 1 was conducted for the hose connecting assembly of the embodiment 2. The experiment shows results which are almost similar to those of hose connecting assembly of the embodiment 1. It is apparent that stress cracking is prevented from occurring while a sealing pressure is kept.

The hose connecting assembly of the present embodiment has water absorbing properties since the connecting tube 1' is formed of nylon 6,6. If the assembly is used for a coolant passage of an engine, the connecting tube 1' would absorb water so that it would swell about 1 to 7% in volume. Accordingly, in such a circumstance a greater diameter increasing force would be applied to the hose, resulting in that the sealing properties are even more enhanced.

When the resin cover 3 is molded, when a molten resin is brought into contact with any portion of the connecting tube 1' that is exposed within the cavity of the mold, the molded cover 3 will adhere to the connecting tube 1' in this potions. Therefore, integrity between the cover 3 and connecting tube 1' is further enhanced.

The content of the glass fibers contained in the connecting tube 1' is double as much as that of the glass fibers contained in the cover 3. The connecting tube 1' has rigidity which is higher than that of the cover 3. Accordingly, the connecting tube 1' can resist strains such as an injection pressure applied on molding of the cover 3 and a shrinkage force.

EMBODIMENT 3

Figure 4:
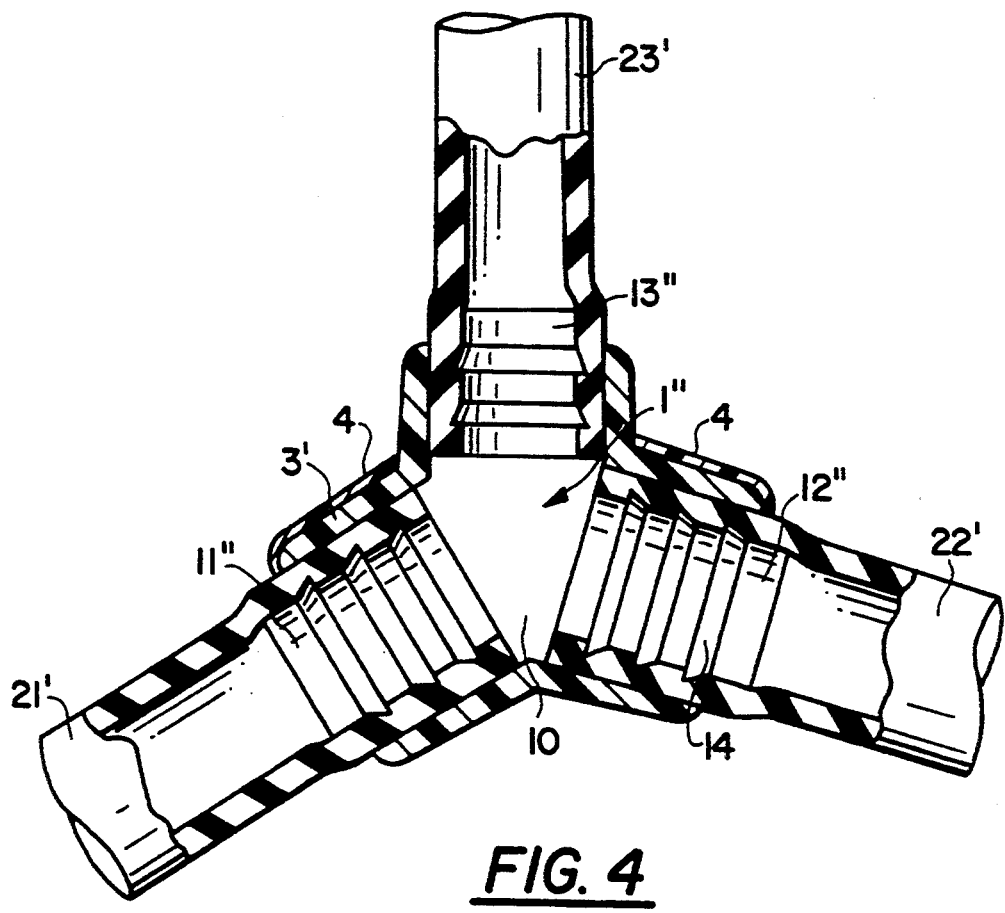
FIG. 4 is a sectional view showing a hose connecting assembly in a third embodiment of the present invention.

Referring now to FIG. 4, a sectional view is shown of a third embodiment of a hose connecting assembly produced according to the present invention. The hose connecting assembly comprises a connecting tube 1" having three branches extending in three directions, three rubber hoses 21', 22' and 23' into which three branches of the connecting tube 1" are inserted, a cover 3' for covering the connecting portions between the tube 1" and hoses 21', 22' and 23' and a coating or protecting layer 4 which coats a part of the cover 3'.

The tube 1" comprises a central portion 10 and three branches 11" 12" and 13" which are branched from the central portion 10. The tube 1" is formed of a fiber reinforced polyamide resin by molding The branches 11", 12" and 13" are formed on the outer periphery thereof with a plurality of spaced annular ribs 14 which resist removal of the hoses from the branches.

The hoses 21', 22' and 23' are water hoses for low pressure water used as radiator hoses and have a triple-layered structure comprising three reinforcing layers which are braided with nylon threads. The layers are laminated in such a manner that EPDM layers are sandwiched therebetween The branches 11", 12" and 13" of the connecting tube 1" are inserted to the hoses 21', 22' and 23' respectively, to constitute a passage for engine coolant.

The cover 3' is formed of a fiber reinforced resin in which 15% by weight of glass fibers are contained in nylon 6,6 by molding and covers the connecting portions between the connecting tube 1" and the hoses. The cover 3' is also in contact with portions of the central portion 10 and is integrally bonded to the central portion 10 of such locations.

The coating layer 4 is formed of a two-liquid acryl-urethane coating composition and covers weld portions formed in the cover 3' on the hoses 21', 22' and 23' at a film thickness 10 to 20 $\mu$m.

Figure 5:
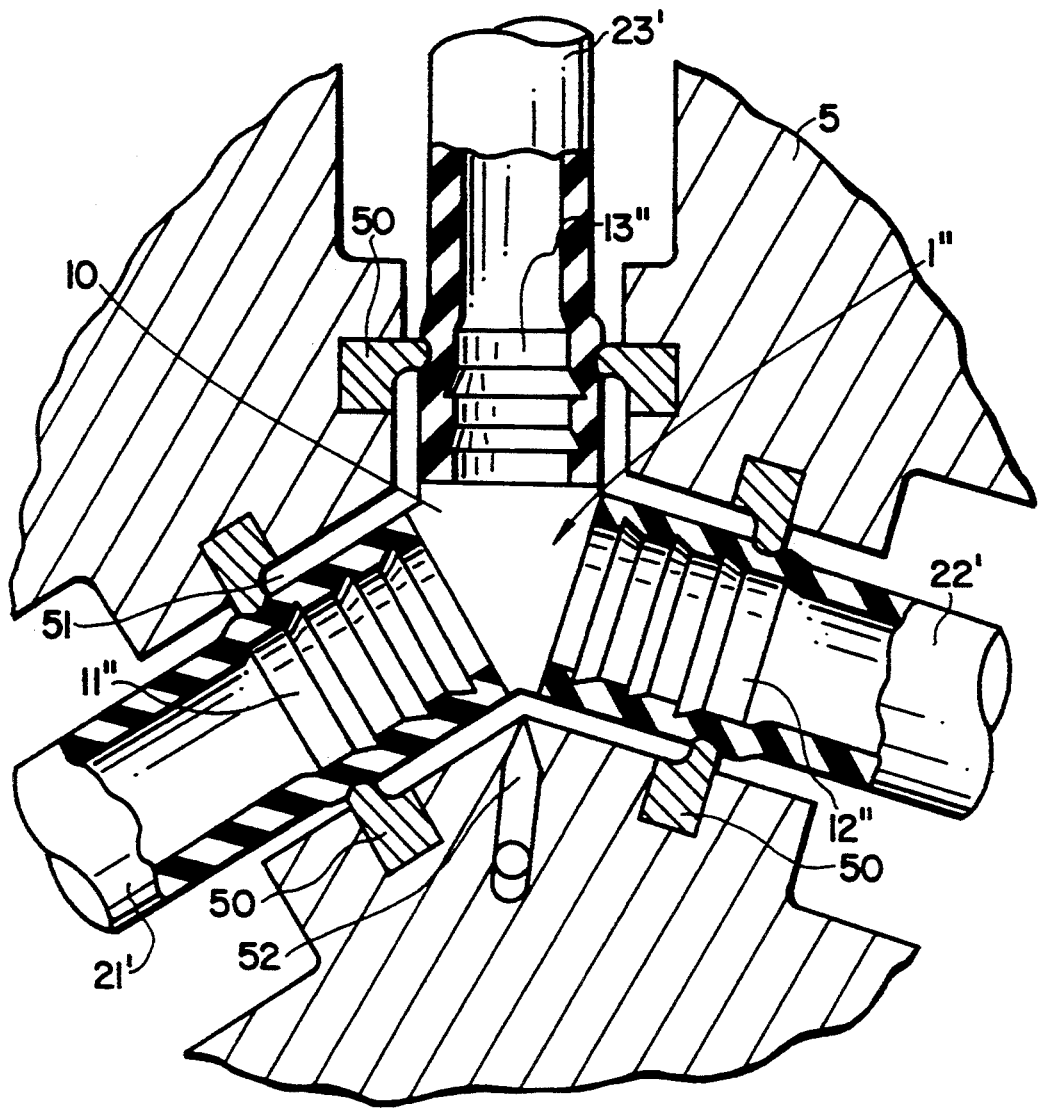
FIG. 5 is an explanatory sectional view illustrating a method of forming a cover of the hose connecting assembly of FIG. 4.

To produce the hose connecting assembly the branches 11", 12" and 13" of the connecting tube 1" are first inserted into the front ends of the hoses 21', 22' and 23' respectively, until the front ends of the hoses will abut upon the central portion 10. The connecting tube 1" having the branches inserted into the hoses 21', 22' and 23' is placed as an insert in a mold 5 as show in FIG. 5. Seal rings 50 are held in the mold 5 so that the hoses are disposed between the branches 11", 12" and 13" and the rings 50 Each seal ring 50 comprises two split rings which are held on upper and lower halves. The two split rings are fit together to form a ring on clamping of halves. A space which is surrounded by the inner surface of the mold 5, a part of the central portion 10 of the tube 1" and the ends of the hoses 21', 22' and 23' and the seal rings 50 defines a mold cavity 51.

The injection molding phase is accomplished, following mold closure, by injecting a molten resin into the cavity 51 through a gate 52 located in a connection between two branches 11" and 12". The molten resin containing glass fibers enters into the cavity 51 through the gate 52 and flows throughout the cavity 51 in substantially peripheral directions around the hoses 21' and 22' and thereafter flows around the hoses 23' in a substantially axial direction and fills the cavity 51. The cover 3' is thus formed.

Figure 6:
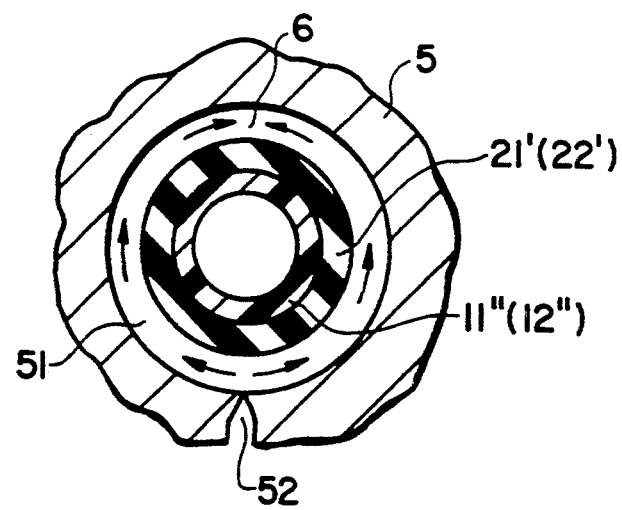
FIG. 6 is a sectional view showing the flow of a material of the cover when the cover is molded.
Figure 7:
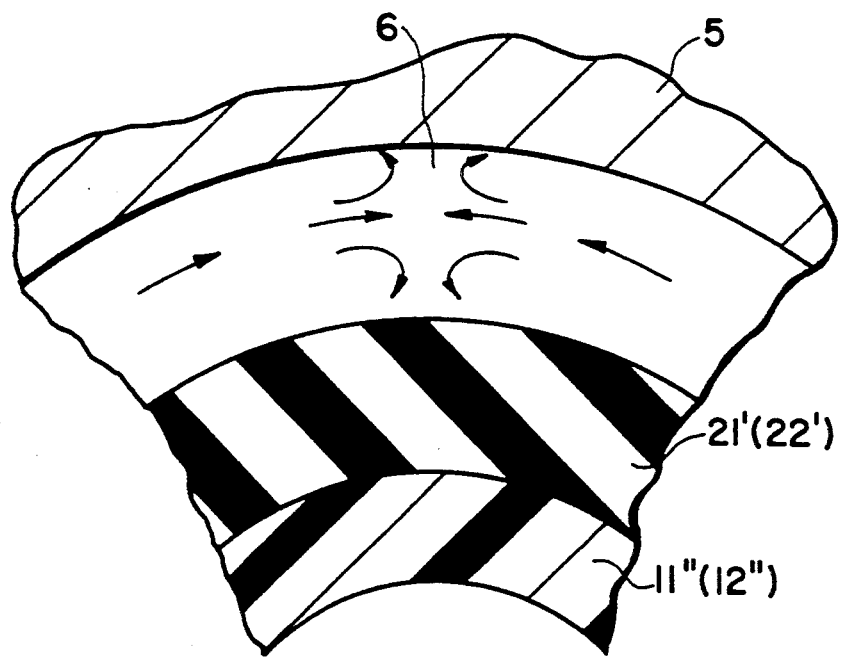
FIG. 7 is an enlarged view showing a main part of FIG. 6.

Therefore, the molten resin flows around the hoses 21' and 22' in directions represented by arrows in FIGS. 6 and 7 to form welds 6 extending in an axial direction of the hose in the side opposite to gate 52.

After molding, the mold is opened and the hose connecting assembly is removed from the mold. A two-liquid acryl-urethane coating composition (Origiplate Z manufactured by Origin Denki K.K.) is applied on the welds 6 of the ends of the hoses 21' and 22' with a brush so that the coating film has a thickness of 10 to 20 $\mu$m. The coating film is dried at 70° C. for 30 minutes and is baked at 120° C. for 30 minutes for curing to form the coating film 4.

EXPERIMENTAL EXAMPLE 3

After a resultant hose connecting assembly was immersed in warm water of 60° to 80° C. for 12 to 15 hours, a coating step, in which the entire surface of the cover 3' was coated with film 4 comprised of an aqueous solution of containing 5% zinc chloride with a brush and was heated at 100° C. for one hour, was repeated three times and thereafter the hose connecting assembly was immersed in warm water of 60° to 80° C. for 2 to 3 hours. Thereafter, the same coating step was repeated three times again and the hose connecting assembly was then immersed in warm water of 60 to 80° C. This process is defined as one cycle. The number of times of applying zinc chloride until a crack occurred on the surface of the assembly was measured. A result was shown in Table 2.

COMPARATIVE EXAMPLE 1

A first hose connecting assembly which is substantially identical with that of the embodiment 3, except that the cover was made of nylon 6,6 containing no glass fibers and no coating film 4 was formed, was used for a first comparative experiment similar to that in Experimental Example 3. A result is shown in Table 2.

COMPARATIVE EXAMPLE 2

A second hose connecting assembly which was substantially identical with the embodiment 3, except that no coating film was formed, was used for a second comparative example. A result is shown in Table 2.

TABLE 2

|  | cover 3 | coating film 4 | application times |
| --- | --- | --- | --- |
| EXP.2 | nylon 6,6 + glass fibers | present | 100 or more |
| COMPAR EXP. 1 | nylon 6,6 | absent | 3 |
| COMPAR EXP. 2 | nylon 6,6 + glass fibers | present | 25 to 60 |

A similar experiment using an aqueous solution containing 5% calcium chloride in lieu of zinc chloride gave a result which is similar to those shown in Table 2.

Table 2 shows that the hose connecting assembly of the comparative example 2 has large variations in performances although it has sufficiently practical performance. However, formation of the coating film 4 on the welds remarkably increases the number of cycles which can occur until a crack occurs and reduces variations in performance.

Although the coating film 4 is formed only on the welds in the present embodiment, an embodiment in which the coating film 4 is formed over the entire surface of the cover 3' provides similar and ornamental effects.

EMBODIMENT 4

The fourth embodiment is substantially identical with embodiment 3 in structure except that tan aluminum foil is coated on the welds of the cover 3' in lieu of the coating film 4. An illustration of embodiment 4 is omitted herein. The hose connecting assembly of the present embodiment is formed by molding a cover while the aluminum foil is placed on the inner surfaces of the mold 5 corresponding to welds 6.

The hose connecting assembly of the present embodiment has effects similar to those of embodiment 3. Since a protecting layer can be formed simultaneously with the formation of the cover 3' in the present embodiment, the number of steps for producing the assembly can be reduced in comparison with that taken for producing the hose connecting assembly in embodiment 3. Resin films such as Teflon film and nylon film can be used as well as the aluminum foil.

Briefly, in the hose connecting assembly of the present invention, a crack due to the weakness of the weld can be more easily prevented from occurring in comparison with the hose connecting assembly including a cover which is made of conventional fiber reinforced resins. Since the resistance to snow melting salt is enhanced, the durability of the assembly is similarly enhanced.

EMBODIMENT 5

Figure 8:
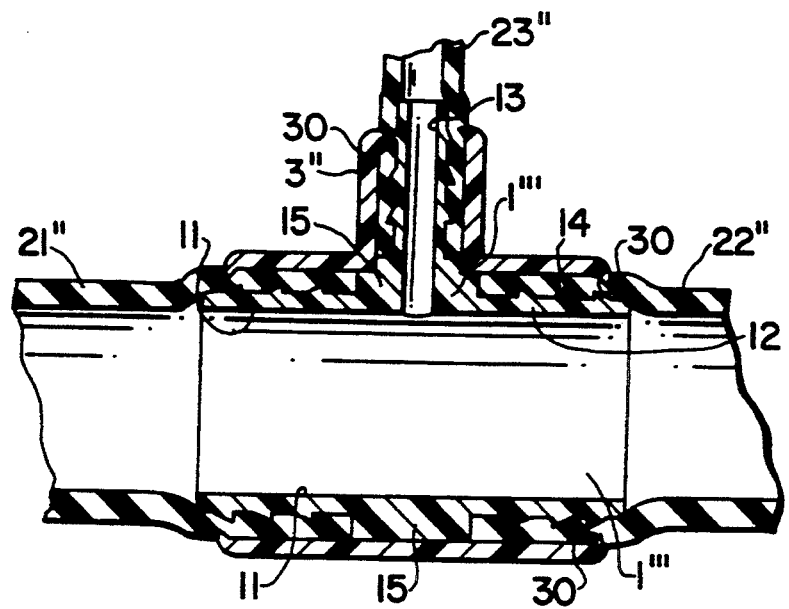
FIG. 8 is a sectional view showing a hose connecting assembly in a fifth embodiment of the present invention.
Figure 9:
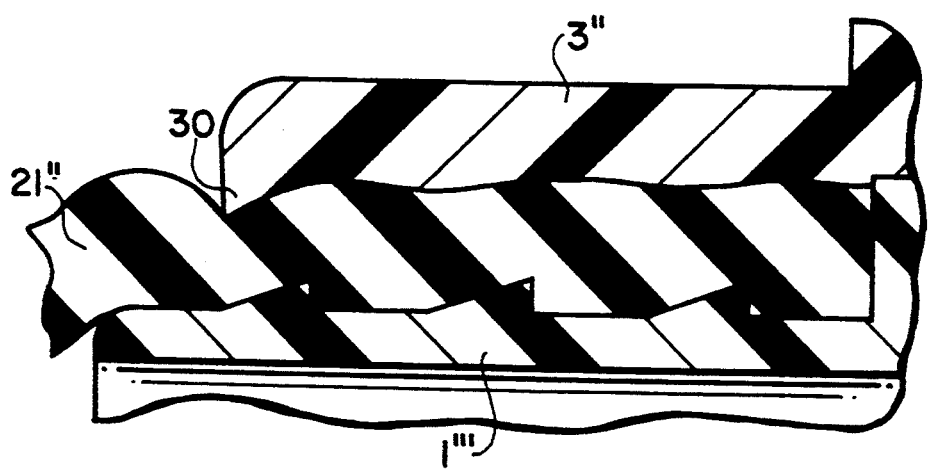
FIG. 9 is an enlarged sectional view showing a main part of the assembly of FIG. 8.

Referring now to FIGS. 8 and 9, a fifth embodiment of a hose connecting assembly is shown which comprises a connecting tube 1''' having three branches extending in three directions, three hoses 21'', 22'' and 23'' into which the branches of the connecting tube 1''' are inserted, and a resin cover 3'', which covers the entire periphery of the connections between the hoses 21'', 22'' and 23'' and the connecting tube 1'''.

The hoses 21'', 22'' and 23'' are triple-layered reinforced hoses including an intermediate layer which is braided with reinforcing threads. The connecting tube 1''' comprises three branches 11, 12 and 13 is provided with a plurality of spaced annular ribs 14 on the surface thereof for preventing the hose from removing from the branch. The connecting tube 1''' includes a thick walled central portion 15 between the branches 11 and 12. The annular ribs 14 have tapered surfaces having a diameter which gradually increases from the open ends of the branches 11, 12 and 13 toward the thick walled central portion 15.

The resin cover 3'' substantially covers the entire connecting tube 1''' and is provided with annular projections 30 which project inwardly in a radial direction toward the outer periphery of the hoses 21'', 22'' and 23'' at the distal ends of the cover 3''. The annular projections 30 are provided at positions corresponding to any of the annular rib 14 of the connecting tube 1'''.

In order to produce the hose connection tube 1''' three branches 11, 12 and 13 extending in three directions are inserted into hoses 21'', 22'' and 23'', respectively, until the ends of the hoses 21'', 22'' and 23'' abut upon the thick walled central portion 15. The connecting tube 1''' having the branches which are inserted into the hoses 21'', 22'' and 23'' is placed in a mold 5.

Figure 10:
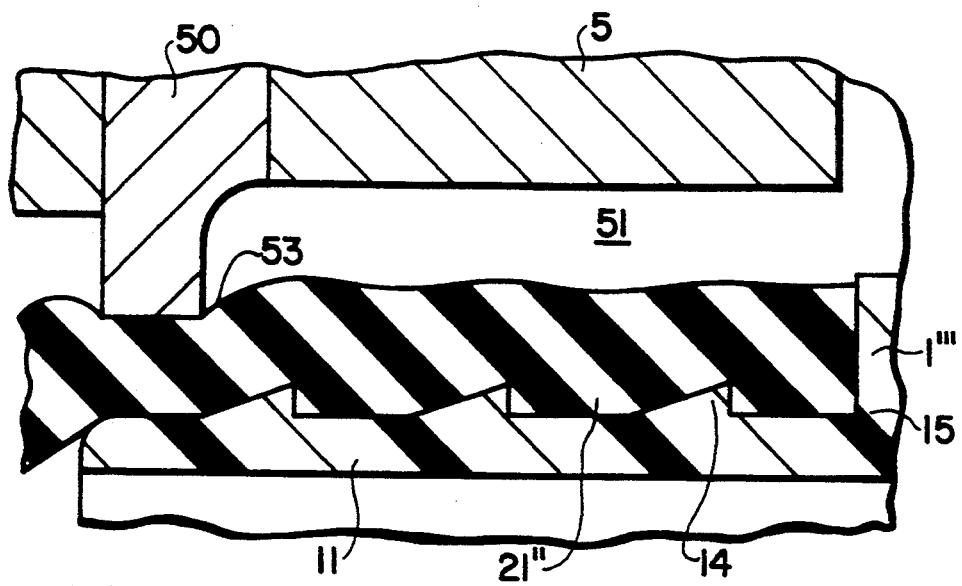
FIG. 10 is a sectional view showing a method of forming a resin cover of the hose connecting assembly of FIG. 8.

At this time, seal rings 50, which are provided at the end of a molding cavity 51 defined by the mold 5, the hoses 21'', 22'' and 23'' and the connecting tube 1''' are adapted to press the hoses 21'', 22'' and 23'' toward the connecting tube 1''' for sealing the molding cavity 51 by the elasticity of the hoses 21'', 22'' and 23'' as shown in FIG. 10. Ring-shaped recesses 53, having a diameter reduced tapered surface, are formed on the hoses 21'', 22'' and 23'' by the pressing action of the sealing rings 50 at positions corresponding to inner edges of the sealing rings 50.

Then, molten resin is injected into cavity 51 for forming the resin cover 3''. The molten resin fills the recesses 53 for forming annular projections 30. When the mold 5 and the sealing rings 50 are removed after the resin cover 3" has been cooled and solidified, parts of the hoses 21", 22" and 23" which have been pressed by the sealing rings 50 expand in an outer radial direction by their own elastic recovery force, causing the annular projections to bite into the hoses 21", 22" and 23".

Since the hoses 21", 22" and 23" are bitten and compressed between the annular projections 30 and annular ribs 14 in the hose connecting assembly of the present embodiment, the present hose connecting assembly is more excellent tin fastening strength and sealability in comparison with prior art hose connecting assemblies.

EMBODIMENT 6

Figure 11:
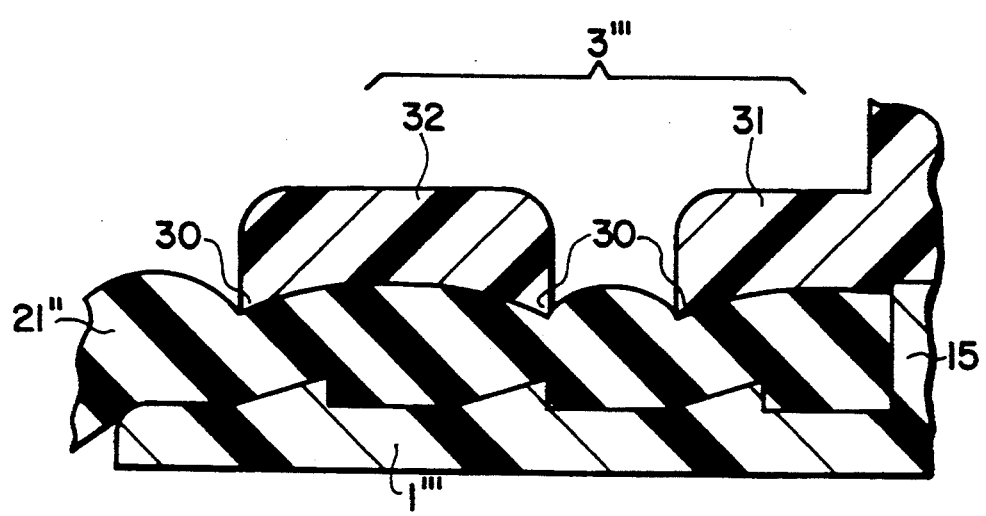
FIG. 11 is a sectional view showing a hose connecting assembly in a sixth embodiment of the present invention.

Referring now to FIG. 11, there is shown a hose connecting assembly corresponding to a sixth embodiment. The sixth embodiment is substantially identical with embodiment 5 except that the resin cover 3" are separated into a first cover 31 covering the thick walled central portion 15 and cylindrical second cover 32 which are spaced therefrom by omitting annual parts from the resin cover 3''' and are disposed in front of the first cover 31.

The hose connecting assembly of the present embodiment 6 can be formed by using a mold in which rings are provided in the cavity 51 in the intermediate positions thereof in addition to sealing rings 50 of embodiment 5.

Since the present hose connecting assembly has annular projections which are more than those of embodiment 5, the compression force applied on the hoses 21", 22" and 23" become higher so that the fastening strength is increased Since the hoses 21", 22" and 23" are annularly exposed between the first and second covers 31 and 32, the covers which cover the first and second covers 31 and 32 and the annular exposed parts therebetween may be formed if the annularly exposed portions are undesirable from an ornamental point of view. The covers 3''' may be formed by a molding process similar to those used to produce the resin cover 3. In this case, it suffices to continuously form the second covering by a two color molding.

What is claimed:

1. A hose connecting assembly comprising: a connecting tube; a flexible hose having at least one open end into which an end portion of said connecting tube is inserted, whereby an end portion of said flexible hose covers said end portion of said connecting tube;
   a cover molded over and extending over said end portion of said flexible hose, such that said end portion of said flexible hose is snugly held between said molded cover and said end portion of said connecting tube;
   wherein a post-shrinkage factor of said molded cover is 0.2% to 0.9% and said end portion of said flexible hose has an inner diameter which is elastically increased by 10% to 30% by inserting said end portion of said connecting tube into said end portion of said hose.

2. A hose connecting assembly as defined in claim 1 in which said molded cover is comprised of 85 to 55% by weight of a synthetic resin and of 15 to 45% by weight of a reinforcing filler.

3. A hose connecting assembly as defined in claim 2 in which said synthetic resin includes polyamide resins, polyester resins and polyphenylene sulfide (PPS).

4. A hose connecting assembly as defined in claim 2 in which said reinforcing filler includes at least one of calcium carbonate, barium sulphate, glass fiber, metal fiber, ceramic fiber, rayon, and aromatic polyamide fiber.

5. A hose connecting assembly as defined in claim 2 in which said molded cover includes 55 to 85% by weight of the synthetic resin made of nylon 6,6 and 15 to 45% by weight of the reinforcing filler made of glass fiber.

6. A hose connecting assembly as defined in claim 1 in which said flexible hose has a triple-layered structure comprising three reinforcing layers which are braided with nylon threads, said reinforcing layers sandwiching ethylene-propylene-diene-polymer (EPDM) films therebetween.

7. A hose connecting assembly as defined in claim 1 which said connecting tube is made of nylon 6,6.

8. A hose connecting assembly as defined in claim 1 in which said connecting tube has a higher rigidity than that of said molded cover.

9. A hose connecting assembly as defined in claim 1, wherein said molded cover includes a weld area formed during manufacture of said cover by molding and a protecting layer which protectively covers an outer surface of said weld area.

10. A hose connecting assembly comprising:
    a connecting tube;
    a flexible hose into which at least one open end portion of said connecting tube is inserted, such that an end portion of said hose covers an end portion of said connecting tube; and
    a cover molded over and extending snugly over said end portion of said hose, such that said end portion of said hose is fixed between said molded cover and said end portion of said connecting tube,
    wherein said molded cover has annular projections which project in a radially inward direction to at least restrain movement of said hose along an axial direction of said end portion of said connecting tube; and
    wherein the post-shrinkage factor of said cover is 0.2% to 0.9% and said hose has an inner diameter which is elastically increased by 10% to 30% by inserting said connecting tube into said hose.

11. A hose connecting assembly as defined in claim 10 in which said cover is comprised of 85 to 55% by weight of a synthetic resin and 15 to 45% by weight of a reinforcing filler.

12. A hose connecting assembly as defined in claim 11 in which said synthetic resin includes at least one of nylon 6, nylon 6,6, polyester resins, and polyphenylene sulfide (PPS).

13. A hose connecting assembly as defined in claim 11 in which said reinforcing filler includes at least one of calcium carbonate, barium sulphate, glass fiber, metal fiber, ceramic fiber, rayon, and aromatic polyamide fiber.

14. A hose connecting assembly as defined in claim 11 in which said molded cover includes 55 to 85% by weight of the synthetic resin made of nylon 6,6 and 15 to 45% by weight of the reinforcing filler made of glass fiber.

15. A hose connecting assembly as defined in claim 10 in which said flexible hose has a triple-layered structure comprising three reinforcing layers which are braided with nylon threads, said reinforcing layers sandwiching ethylene-propylene-diene polymer (EPDM) films therebetween.

16. A hose connecting assembly as defined in claim 10 in which said connecting tube is made of nylon 6,6.

17. A hose connecting assembly as defined in claim 10 in;Which said connecting tube has a higher rigidity than that of said molded cover.

18. A hose connecting assembly as defined in claim 10, wherein said molded cover includes a weld area formed during manufacture of said cover by molding and a protecting layer which protectively covers an outer surface of said weld area.

19. A hose connecting assembly as defined in claim 10 wherein said connecting tube includes a plurality of annular ribs extending outwardly from the surface thereof and said molded cover includes a plurality of annular projections each being located at a position that substantially opposes a corresponding one of said ribs so that the hose is held therebetween.

* * * * *